United States Patent [19]

Bratkowski et al.

[11] Patent Number: 5,612,600
[45] Date of Patent: Mar. 18, 1997

[54] POSITION ENCODER SYSTEM FOR A MOVABLE PANEL

[75] Inventors: Edward J. Bratkowski, Harrison Township; Lloyd G. Racine, Shelby Township; Pam Storey, Utica, all of Mich.

[73] Assignee: Webasto Sunroofs Inc., Rochester Hills, Mich.

[21] Appl. No.: 544,312

[22] Filed: Oct. 17, 1995

[51] Int. Cl.$^6$ ........................................... G05B 19/29
[52] U.S. Cl. .................. 318/266; 318/283; 318/466; 200/61.71; 296/223
[58] Field of Search ...................... 318/561, 571, 318/603, 601, 280, 283, 286, 452, 466, 470, 365, 266, 602; 200/61.62, 61.71; 296/223, 216, 128, 219

[56] References Cited

U.S. PATENT DOCUMENTS

| | | |
|---|---|---|
| 2,393,492 | 1/1946 | Yardeny . |
| 2,676,289 | 4/1954 | Wulfsberg et al. . |
| 2,823,344 | 2/1958 | Ragland . |
| 3,017,557 | 1/1962 | Amato . |
| 3,199,007 | 8/1965 | Stewart . |
| 3,206,117 | 9/1965 | Anderson et al. . |
| 3,496,438 | 2/1970 | Kull . |
| 4,567,416 | 1/1986 | Brunier-Coulin . |
| 4,631,461 | 12/1986 | Peugeot . |
| 4,673,853 | 6/1987 | Tsunoda et al. . |
| 4,774,446 | 9/1988 | Salazar et al. ............... 318/561 |
| 4,821,644 | 4/1989 | Gawler . |
| 4,834,283 | 5/1989 | Akabane et al. . |
| 4,849,690 | 7/1989 | Miyamoyo . |
| 4,983,892 | 1/1991 | Suga et al. . |
| 5,045,765 | 9/1991 | Wissler . |
| 5,064,031 | 11/1991 | Kakizaki . |
| 5,139,353 | 8/1992 | Ota et al. ..................... 400/584 |
| 5,147,989 | 9/1992 | Ito . |
| 5,184,050 | 2/1993 | Harada et al. . |
| 5,250,882 | 10/1993 | Odoi et al. . |
| 5,253,138 | 10/1993 | Droulon et al. . |
| 5,293,517 | 3/1994 | Andruet . |
| 5,334,876 | 8/1994 | Washeleski et al. . |
| 5,406,179 | 4/1995 | Davall et al. . |
| 5,442,858 | 8/1995 | Wolters et al. . |

FOREIGN PATENT DOCUMENTS

| | | |
|---|---|---|
| 0351280 | 5/1988 | European Pat. Off. . |
| 443216A | 9/1991 | European Pat. Off. . |
| 3829405A1 | 3/1990 | Germany . |
| 3-227718 | 10/1991 | Japan . |

*Primary Examiner*—John W. Cabeca
*Attorney, Agent, or Firm*—Cushman Darby & Cushman IP Group of Pillsbury Madison & Sutro, LLP

[57] ABSTRACT

A position encoding system is provided for controlling movement of a movable panel between predetermined positions. The panel is moved by a pair of cables coupled thereto. The system includes a housing assembly and a motor mounted with respect to the housing assembly. The motor has an output shaft rotatable in a forward direction and a reverse direction. Drive gear structure rotates in response to rotation of the output shaft. The drive gear structure cooperates with the pair of cables such that rotation of the drive gear structure moves the cables linearly and thus moves the panel. An encoder gear rotates continuously through multiple revolutions of the output shaft. The encoder gear includes a plurality of electrically conductive contacts on a surface thereof. An idler gear is coupled between the drive gear structure and the encoder gear so as to transfer motion of the drive gear structure to the encoder gear. A printed circuit board is mounted within the housing assembly and has a circuit thereon. The circuit includes stationary circuit board electrically conductive contacts thereon and has a microprocessor. The circuit board contacts are arranged in such a manner so as to be engaged by associated encoder gear conductive contacts upon rotation of the encoder gear. Certain of circuit board contacts are associated with particular positions of the movable panel and engagement of the encoder gear contacts with the circuit board contacts generates signals which are inputted to the microprocessor so that the microprocessor can control the motor and thus the movement of the panel.

11 Claims, 5 Drawing Sheets

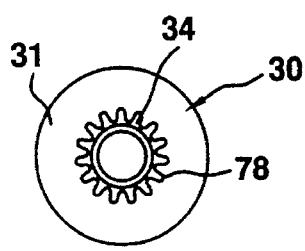
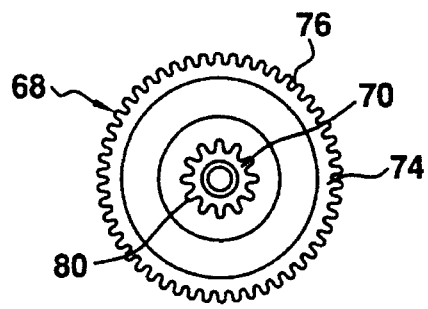
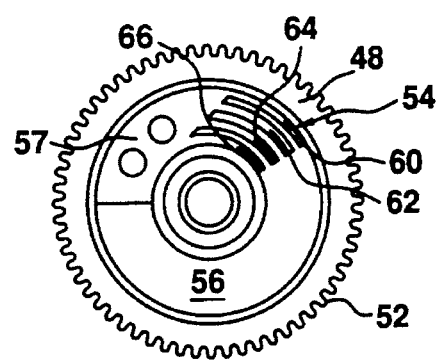
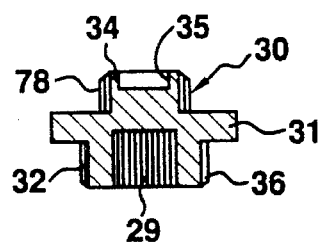
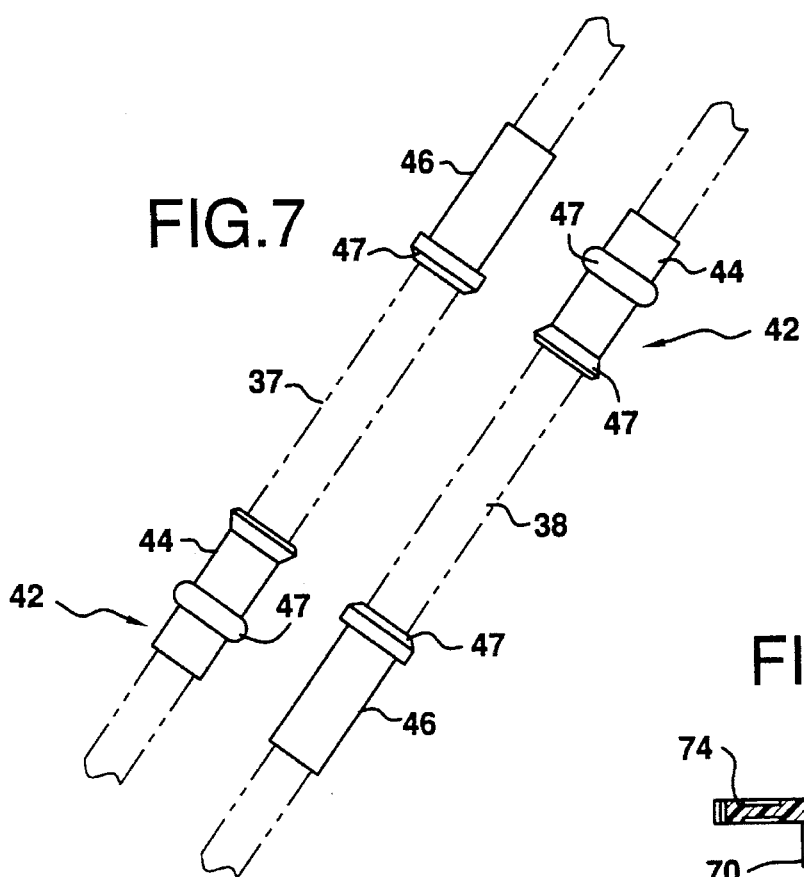
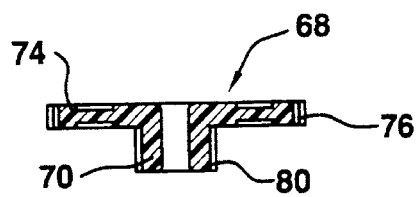

POSITION ENCODER SYSTEM FOR A MOVABLE PANEL

BACKGROUND OF THE INVENTION

This invention relates to a position encoder system for use in driving a movable panel, and, more particularly, to a position encoder system for controlling movement of a sunroof panel of a vehicle.

Position encoding systems have been developed to detect present positions of a sunroof panel and to control movement of the panel between predetermined positions. For example, U.S. Pat. No. 5,184,050 discloses a sunroof panel motor for intermittently driving a disc having contacts thereon which cooperate with contacts carried by a circuit board of the assembly. The contacts on the disc correspond to predetermined positions of the sunroof panel such that the panel may be moved by the motor to or from predetermined positions by detecting the present position of the panel.

The conventional assembly is coupled to a wire fitted about a drive pinion. The wire is connected to the panel and stretched between the pinion and the panel. The panel is driven in an opening or closing direction by transmitting power through the wire. However, the coupling between the pinion and the wire is a cause for error in positioning of the panel. Further, due to the intermittent movement of the disc, additional positioning errors may occur.

Accordingly, a need exits to provide position encoder system which overcomes the deficiencies of the conventional devices.

SUMMARY OF THE INVENTION

An object of the invention is to fulfill the need referred to above. In accordance with the principles of the present invention, this objective is obtained by providing a position encoder system for controlling movement of a movable panel between predetermined positions. The panel is moved by a pair of cables coupled thereto. The system includes a housing assembly including a pair of spaced channels, each of the channels being constructed and arranged to receive therein a portion of a respective cable of the cable pair. A motor assembly is provided and includes a motor having an output shaft rotatable in a forward direction and a reverse direction.

Drive gear structure is mounted with respect to the housing assembly and operatively associated with the output shaft so as to rotate in a forward and a reverse direction in response to rotation of the output shaft. The drive gear structure is constructed and arranged to cooperate with the pair of cables such that rotation of the drive gear structure will move the cables linearly and thus move the panel.

An encoder gear is mounted within the housing assembly for continuous rotary movement through multiple revolutions of the output shaft. The encoder gear includes a plurality of electrically conductive contacts on a surface thereof. The encoder gear contacts are coupled together electrically.

An idler gear is mounted in the housing assembly and is coupled between the drive gear structure and the encoder gear so as to transfer motion of the drive gear structure to the encoder gear such that the encoder gear rotates at fewer revolutions per minute than the drive gear structure.

The system also includes a printed circuit board mounted within the housing assembly and having a circuit thereon. The circuit includes a plurality of stationary circuit board electrically conductive contacts, a microprocessor, and a pair of relays electrically coupled between the motor and the microprocessor. The circuit board contacts are arranged in such a manner so as to be engaged by associated encoder gear conductive contacts upon rotation of the encoder gear. Certain of circuit board contacts are associated with particular positions of the movable panel such that upon rotation of the encoder gear, electrical contact between certain of the circuit board contacts and certain of the encoder gear contacts generates binary codes associated with particular positions of the movable panel. The binary codes are inputted to the microprocessor. The microprocessor is constructed and arranged to decode a present panel position, based on the binary codes, in response to a user inputted signal corresponding to a desired panel position. The microprocessor controls the direction of rotation of the output shaft in response to the user inputted signal by energizing one relay of the pair of relays, thereby controlling the direction of movement of the drive gear structure and thus the movement of the panel.

Other objects, features and characteristics of the present invention, as well as the function of the related elements of the structure, and the combination of parts and economies of manufacture, will become more apparent upon consideration of the following detailed description and the appended claims with reference to the accompanying drawings all of which form a part of this specification.

BRIEF DESCRIPTION OF THE DRAWINGS

FIG. 4a is a plan view of the drive gear of the position encoder system;

FIG. 4b is a sectional view of drive gear of FIG. 4a.

FIG. 5a is a plan view of an idler gear of the position encoder system;

FIG. 5b is a sectional view of the idler gear of FIG. 5a;

FIG. 6 is a plan view of an encoder gear of the position encoder system shown with contact brushes attached;

FIG. 7 is a plan view of tube assemblies for mounting the panel drive cables to the position encoder system;

DETAILED DESCRIPTION OF THE PREFERRED EXEMPLARY EMBODIMENT

Figure 1:
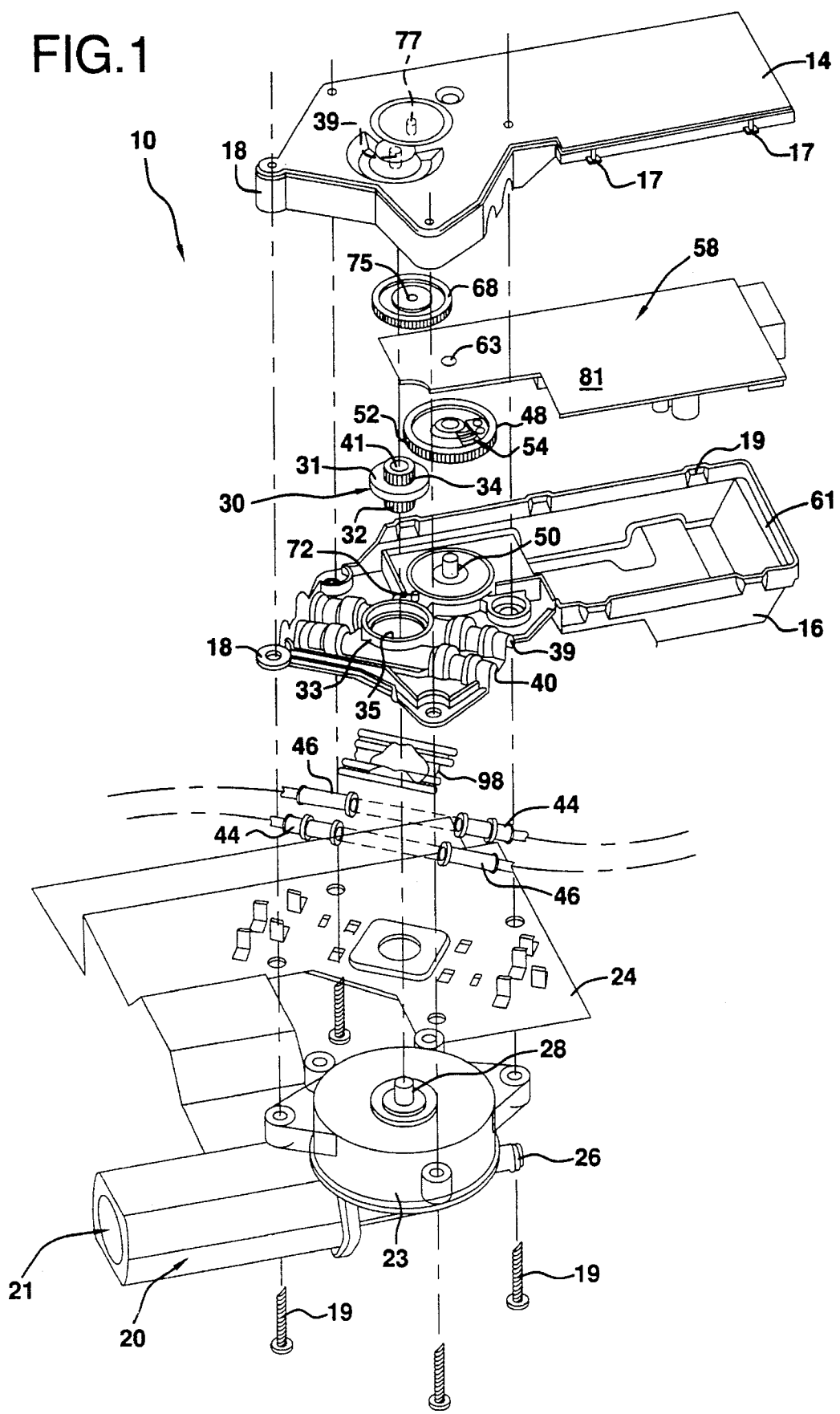
FIG. 1 is an exploded perspective view of the position encoder system provided in accordance with the principles of the present invention, shown with a mounting bracket for the system.
Figure 3:
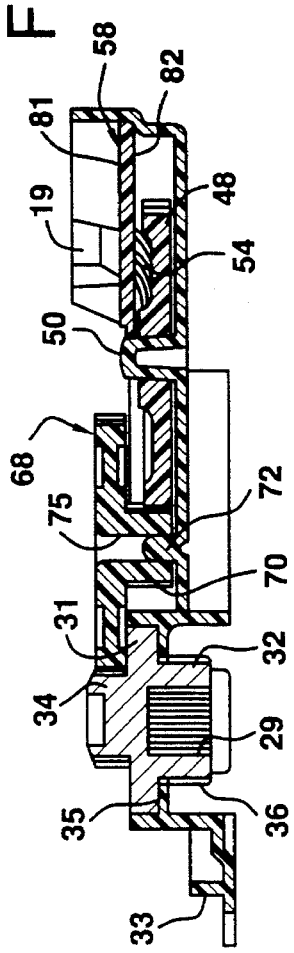
FIG. 3 is a sectional view taken along the line 3—3 of FIG. 2.

Referring to the drawings, a position encoder system, generally indicated at 10, is shown which embodies the principles of the present invention. In the illustrated embodiment, the system 10 is constructed and arranged to be employed in a vehicle sunroof assembly for determining a present position of a movable panel of the assembly and displacing the panel between predetermined positions. It will be appreciated that the system 10 can be employed to control movement of any panel which is constructed and arranged to be moved in response to inputted rotary motion.

Figure 2:
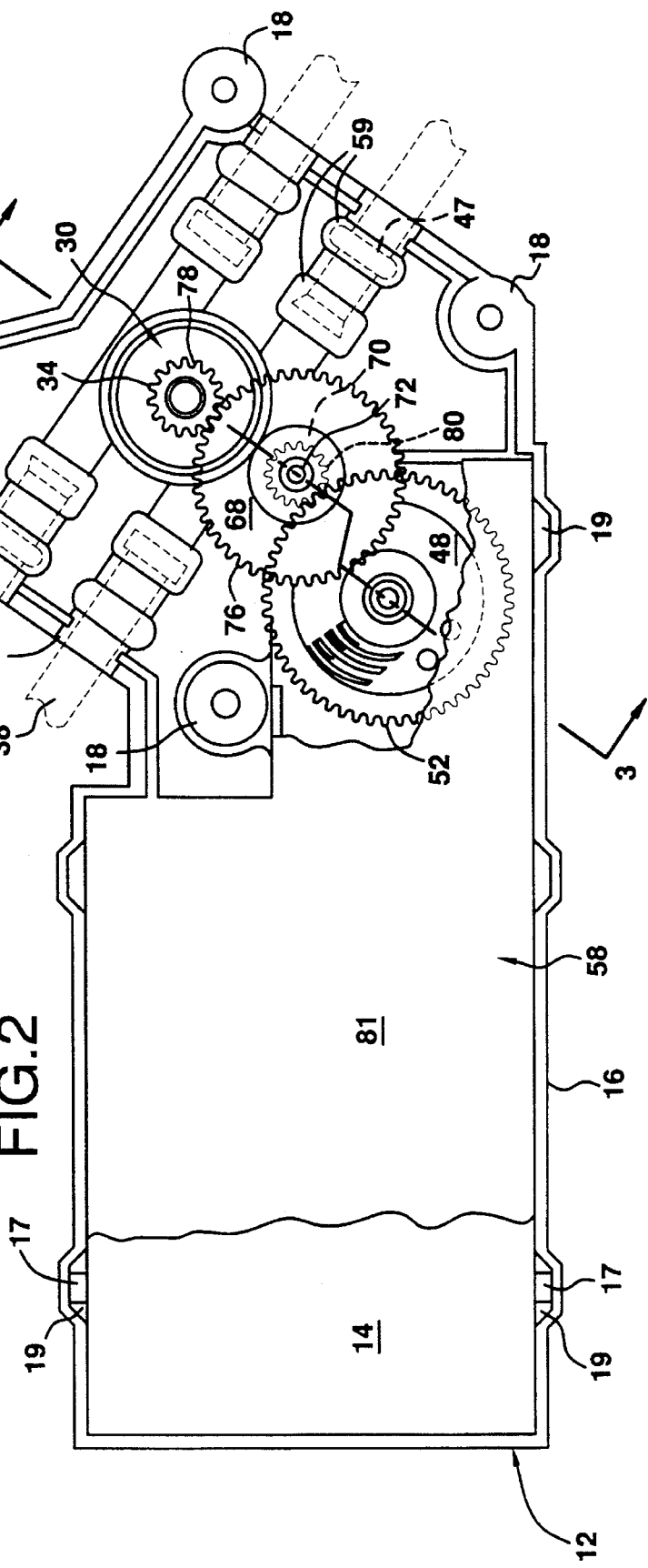
FIG. 2 is a plan view of the position encoder system of FIG. 1, shown with the motor removed and with a portion of a front housing cover and a portion of the circuit board broken away for clarity of illustration.

The system 10 includes a housing assembly, generally indicated at 12 in FIG. 2, including a front cover 14 and a rear cover 16. Tabs 17 of the front cover 14 snap into recesses 19 of the rear cover 16 to secure the cover together. Each cover 14 and 16 is preferably molded from plastic material. The housing assembly 12 includes a plurality of bosses 18 for mounting the assembly 12 with respect to the a motor assembly, generally indicated at 20, and to the vehicle sunroof (not shown), via fasteners 19. As shown in FIG. 1, the motor assembly 20 includes an electric motor 21 which rotates an output shaft 26 thereof in a forward and a reverse direction. The motor assembly also includes a conventional gear (not shown) disposed in a housing 23 and coupled with the output shaft 26. The gear includes a projection 28 extending upwardly from the housing 23. Thus, the projection 28 rotates in response to rotation of the output shaft 26. It can be appreciated that the rotational motion of the output shaft 26 may be transmitted to the projection 28 in any conventional manner.

A bracket 24 extends from the motor assembly 20 for mounting the system 10 to the vehicle sunroof. The bracket 24 design is dependent upon the vehicle type and sunroof arrangement. Thus, the use of the bracket 24 illustrates one example of how the system 10 may be mounted. It is contemplated that certain mounting arrangements of the system 10 may not require bracket 24 or would require a bracket of different configuration than that shown.

The projection 28 of the motor assembly 20 has a toothlike outer periphery which mates with an interior portion 29 (FIG. 4b) of drive gear structure, generally indicated at 30. The drive gear structure 30 is mounted with respect to the housing assembly 12 for rotational movement via projection 28. With reference to FIGS. 1, 4a and 4b, the drive gear structure 30 includes a central portion 31 which is received in boss 33 of the rear cover 16. A pinion 32 extends from the central portion 31 through boss opening 35. The pinion 32 includes a recess 41 which receives post 39 extending from an inner surface of the front cover 14. A spur gear 34, of the drive gear structure 30, is disposed opposite the pinion 32 and within the housing assembly 12. The pinion 32 includes the interior portion 29 which mates with the projection 28 such that rotational motion of the output shaft 26 is transmitted to the drive gear structure 30. An outer periphery of the pinion 32 includes teeth 36 constructed and arranged to engage a pair of cables 37 and 38, shown in dashed lines in FIGS. 1, 2 and 7. As shown in FIG. 2, the pinion 32 is disposed between the cables such that rotation of the pinion in one direction moves the cables linearly in opposite directions. One end of each cable 37, 38 is fixed to individual sides of a movable panel (not shown) of the sunroof assembly and the cables are driven in the known manner by engagement with the teeth 36 of the pinion 32, which moves the panel between opened and closed positions.

With reference to the FIGS., the housing assembly 12 includes a pair of spaced channels 39 and 40 defined therein for receiving a portion of each cable 37 and 38. The pinion 32 is disposed between the channels 39 and 40 and overlaps a portion of each channel so as to ensure engagement with each cable 37 and 38. Each cable may be coupled to an associated channel via a tube assembly, generally indicated at 42. Each tube assembly 42 comprises first and second tubular members 44 and 46 respectively, having flange portions 47 constructed and arranged to engage with an receiving portions 59 of an associated channel to mount a portion of a cable with respect to the housing assembly 12. Each cable 37 and 38 is disposed in the associated tube assembly 42 for sliding movement therein when driven by rotating pinion 32, as will be explained in more detail below. The drive gear structure 30 is preferably made of metal having sufficient strength and rigidity to drive the cables 37 and 38 via pinion 32.

An encoder gear 48, preferably made of plastic, is mounted on fixed shaft 50 within the housing assembly 12 for continuous rotary movement through multiple revolutions of the output shaft 26. As shown in FIGS. 1, 2, and 6, the encoder gear 48 is of generally disk-shape having a plurality of teeth 52 in the periphery thereof. A plurality of electrical contacts are mounted to a surface of the encoder gear 48. In the illustrated embodiment, the contacts are in the form of electrically conductive brushes, generally indicated at 54, extending upwardly from surface 56 of encoder gear 48 in a direction toward the bottom surface 82 of the printed circuit board 58. The brushes 54 are electrically coupled together via base portion 57, which is fixed to surface 56 of the encoder gear 48. In the illustrated embodiment, four brushes 60, 62, 64 and 66, respectively, are provided. Each brush is resilient and of arcuate shape, and disposed at a predetermined radial distance from the center of the encoder gear 48. The function of the brushes will become apparent below.

An idler gear, generally indicated at 68, is mounted within the housing assembly 12 and is coupled between the drive gear structure 30 and the encoder gear 48 so as to transfer rotary motion of the drive gear structure 30 to the encoder gear 48. The idler gear 68 provides speed reduction such that the encoder gear 48 rotates much slower than the drive gear structure 30. The idler gear 68 is preferably made from plastic and, as best shown in FIGS. 5a and 5b, includes a small pinion portion 70 mounted on fixed shaft 72 of rear cover 16 via bore 75 thereof, and a gear portion 74 disposed opposite the pinion portion 70 and cooperating with shaft 77 of the front cover 14 via bore 75. Teeth 76 of the gear portion 74 are in engaged relation with the teeth 78 of the spur gear 34 of the drive gear structure 30, while the teeth 80 of the smaller diameter pinion portion 70 are in engaged relation with the encoder gear teeth 52. Thus, upon rotation of the drive gear structure 30, the idler gear 68 causes the encoder gear 48 to rotate continuously at fewer revolutions per minute than the drive gear structure 30.

Figure 8:
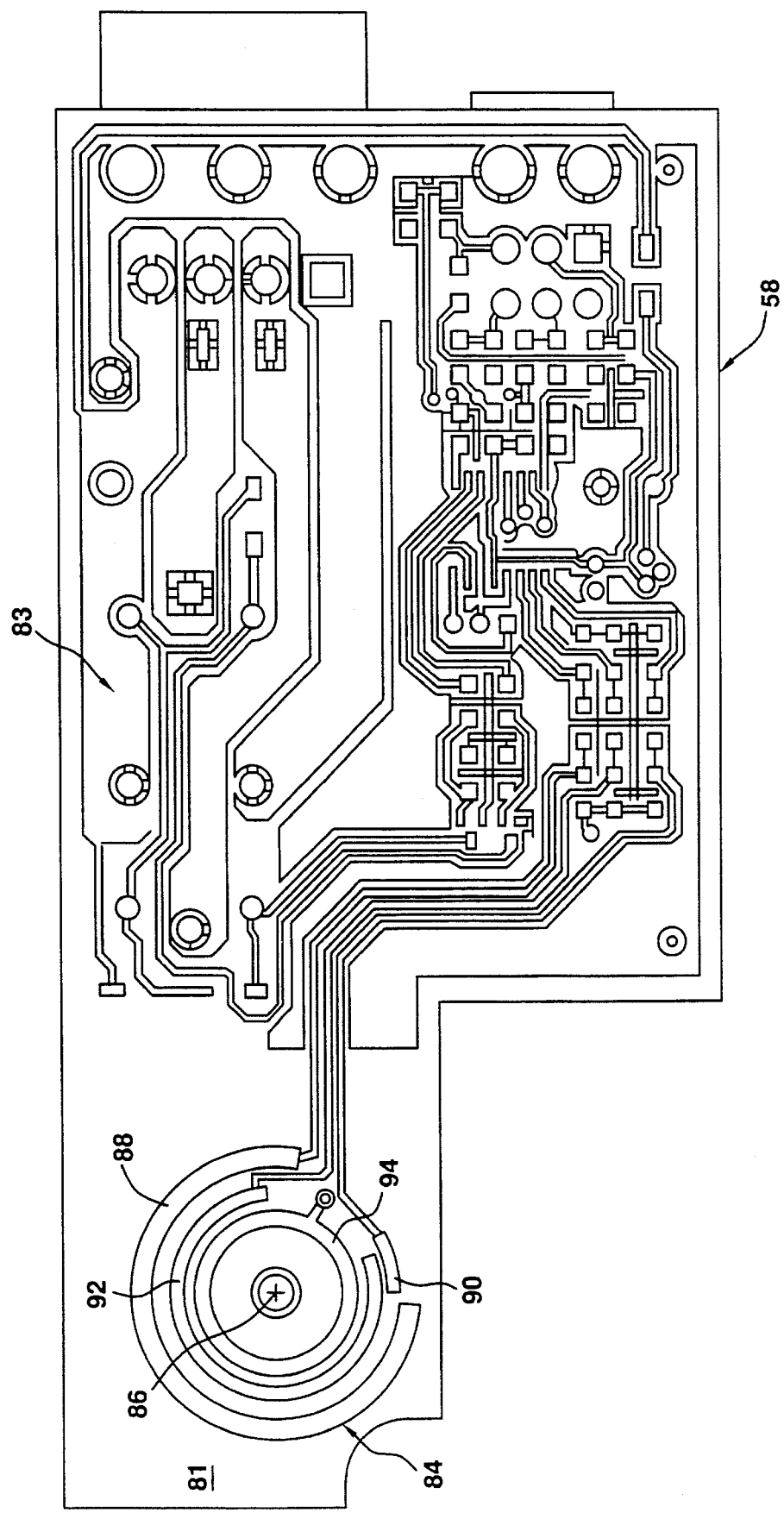
FIG. 8 is an X-ray image of the circuit board of the position encoder system of the present invention.

The printed circuit board 58 is mounted within the housing assembly 12 between the front and rear covers thereof such that edges of the circuit board rest on ledge 61 of rear cover 16 with the bore 63 receiving shaft 50. The circuit board 58 includes top and bottom surfaces 81 and 82, respectively, and electric circuit 83. The electric circuit 83, at the bottom surface 82 of the circuit board 58, includes a plurality of stationary conductive contacts or tracks, generally indicated at 84. Although the contacts 84 appear to be on surface 81 in FIG. 8, it is noted that FIG. 8 is an X-ray image of the circuit board, so the contacts 84 are actually on bottom surface 82. Thus, the circuit board 58 is mounted in the housing assembly 12 such that the contacts 84 are disposed opposite the encoder gear 48. The contacts 84 are arranged on various concentric arcs, disposed at predetermined radial distances from a center point 86 so as to correspond with an associated brush on the encoder gear 48. Thus, upon rotation of the encoder gear 48, brushes 54 electrically contact tracks 84 generating binary codes, as will be explained below.

The circuit board tracks 84 are associated with particular positions of a movable panel. In the illustrated embodiment, four stationary conductive tracks 88, 90, 92 and 94 are provided on the printed circuit board 58 labeled, in FIG. 9, as "SLIDE", "SOFT STOP", "VENT", and "COMMON", respectively, which are contacted by the brushes 60, 62, 64 and 66, respectively, upon rotation of the encoder gear 48.

Figure 9:
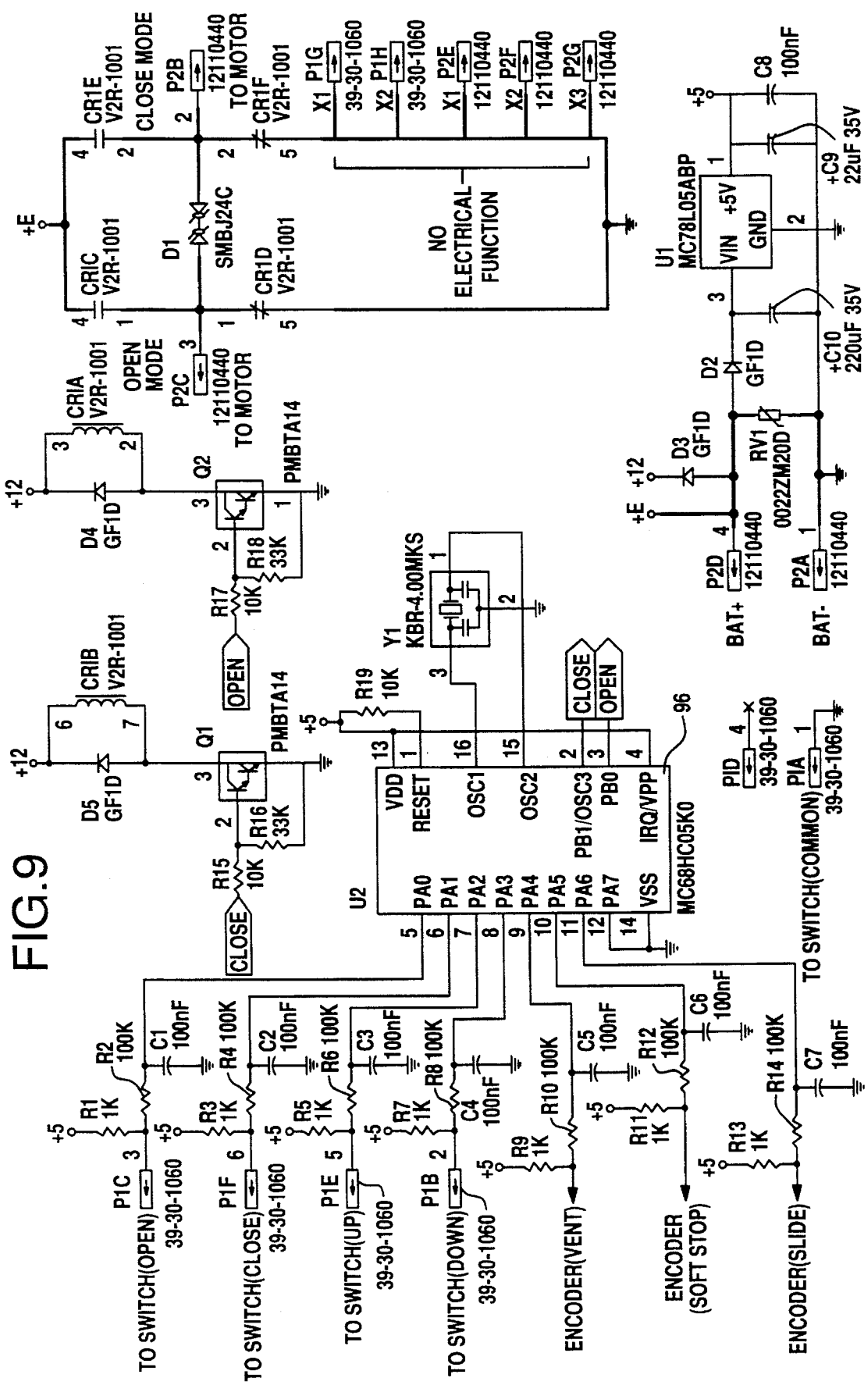
FIG. 9 is a schematic illustration of the circuit of the position encoder system of the invention.

The position encoder system 10 operates as follows when employed with a vehicle sunroof panel. Operation of the motor 21 causes the output shaft 26 to rotate in a forward or a reverse direction which in turn causes the projection 28 and thus the drive gear structure 30 to rotate in a forward or a reverse direction. Movement of the drive gear structure 30 causes rotation of the idler gear 68, which in turn causes the encoder gear 48 to rotate at low speed. As the encoder gear 48 rotates, the brushes 60, 62, 64 and 66 thereon cause the stationary tracks 88, 90, 92 and 94 to be shorted together in various ways. Track 94 is electrically grounded and tracks 88, 90, and 92 are connected to a positive 5 volt source through a nominal resistances (1K-ohm) R9, R11, R13, as shown in FIG. 9. Since brushes 60, 62, 64 and 66 are commonly connected, and brush 66 is constantly connected to track 94 (ground), as the brushes rotate on the concentric tracks, different combinations of tracks will be electrically grounded as the brushes contact the other tracks 88, 90 and 92. The grounded tracks will have a voltage corresponding to the ground voltage (logical 0), while the non-grounded tracks will have a voltage of +5 volts (logical 1). The following truth table is thus generated:

TABLE

| SOFT STOP | VENT | SLIDE | Function/Position |
|---|---|---|---|
| 1 | 0 | 1 | @ Full Vent Position |
| 0 | 1 | 1 | @ Flush Position |
| 1 | 1 | 0 | @ Full Open Position |
| 0 | 0 | 1 | Between Flush & Full Vent |
| 0 | 1 | 0 | Between Flush & Full Open |

As can be seen from the Table above, as the brushes 60, 62, 64 and 66 rotate on the concentric tracks 88, 90, 92 and 94 they will ground the tracks and change the 5 volt potential (logical 1) of each track to a 0 volt potential (logical 0) as different tracks are contacted and grounded depending on the position of the encoder gear 48. This creates the output codes shown above. With reference to FIG. 9, these binary codes are applied to a microprocessor 96 at inputs PA4–PA6 via a conventional low pass filter and signal conditioning network (see R10 and C5, R12 and C6, R14 and C7 in FIG. 9). The microprocessor 96 then decodes the present panel position using these three binary inputs whenever the user commands the sunroof panel to move by pressing one of the interface switches (OPEN, CLOSE, UP, DOWN in FIG. 9) in the user interface, typically mounted in the interior of the vehicle. When the user requests the panel to move through actuation of the interface switches, one of the switches will be connected to ground and will pull one of the four microprocessor inputs dedicated to the user interface (PA0–PA3) to a logic level 0 (low). The user interface switches are connected such that each switch is a normally open contact which, when activated, connects the switch input to ground electrically. When a user interface switch is in its normal state, not activated, a pull-up resistor to +5V on each input (see R1, R3, R5, R7 in FIG. 9) keeps the microprocessor input at a logic level 1 (high). When an interface switch is activated, the microprocessor 96 then sees a transition at its input from a logic level 1 (high) to a logic level 0 (low). Each interface switch input to the microprocessor 96 is signal conditioned and low pass filtered similar to the encoder track inputs to the microprocessor (see R2 and C1, R4 and C2, R6 and C3, R8 and C4 in FIG. 9). This filtering is used to stabilize the inputs before decoding.

The microprocessor 96 can be of any standard type, such as the MC68HC05K0 microprocessor manufactured by the Motorola Corporation. The microprocessor 96 controls the direction of motor rotation in response to the binary code showing the current position and the binary code generated by the user interface switches by energizing one of two relay coils CR1A and CR1B, based on a table stored in the microprocessor relating to the input codes. The contacts of the two relays are arranged in a standard H-Bridge configuration (FIG. 9), with the normally closed contact of each relay connected to ground so that when the relays are de-energized both motor terminals are shorted together and held at ground potential. This facilitates dynamic braking of the motor 21 so that coasting of the motor 21 after turn-off is minimized. Control of the relay coil by the microprocessor 96 is accomplished through the driver networks centered around the Darling transistors Q1 and Q2. Base resistors R15/R16 and R17/R18 establish driver biasing while diodes D4 and D5 prevent the back EMF, generated when the relay coils are de-energized, from destroying Q1 and Q2. Diode D1 in the circuit is used as a transient suppression device across the motor terminals to help limit conducted EMI emissions as well as to limit contact pitting of CR1A and CR1B's contacts during motor turn-on and turn-off.

RV1 provides protection against abnormally high surges on the vehicle power lines by providing a low impedance short to ground for high voltage surges. Finally the remaining components (see D2, D3, U1, C10, C9, C8 in FIG. 9) form a standard configuration +5 volt power supply with input reverse polarity protection.

Thus, as shown in FIG. 9, the stationary circuit board tracks 84 and user input switches are coupled to the microprocessor 96. The microprocessor 96 is electrically coupled to the motor 21 via the pair of relays CR1B and CR1A so as to control the direction of rotation of the output shaft 26 and thus the direction of linear movement of the cables 37 and 38 and the movable panel.

In the illustrated embodiment, the cables 37 and 38 are disposed between the bracket 24 and the housing assembly 12. It has been determined that movement of the cables may wear on the plastic housing assembly 12. To avoid this problem, a wear plate 98, preferably of hardened steel, is provided between the cables and the housing assembly 12 to prevent wear of the housing assembly.

It can be seen that the system 10 of the present invention provides an effective means for determining a position of a movable panel and for moving the panel to a selected position. The continuous rotation of the encoder gear, together with the secure mounting of the cables with respect to the housing assembly, reduces positioning errors.

It thus can be seen that the objects of this invention have been fully and effectively accomplished. It will be realized, however, that the foregoing preferred embodiment has been shown and described for the purposes for illustrating the structural and functional principles of the present invention and are subject to change without departure from such principles. Therefore, this invention includes all modifications encompassed within the spirit of the following claims.

What is claimed is:

1. A position encoder system for controlling movement of a movable panel between predetermined positions, the panel being moved by a pair of cables coupled thereto, the system comprising:

a housing assembly including a pair of spaced channels, each of said channels being constructed and arranged to receive therein a portion of a respective cable of the cable pair;

a motor assembly including a motor having an output shaft rotatable in a forward direction and a reverse direction;

drive gear structure mounted with respect to said housing assembly and operatively associated with said output shaft so as to rotate in a forward and a reverse direction in response to rotation of said output shaft, said drive gear structure being constructed and arranged to cooperate with the pair of cables such that rotation of said drive gear structure will move the cables linearly and thus move the panel;

an encoder gear mounted within said housing assembly for continuous rotary movement through multiple revolutions of said output shaft, said encoder gear including a plurality of electrically conductive contacts on a surface thereof, said encoder gear contacts being coupled together electrically;

an idler gear mounted in said housing assembly and coupled between said drive gear structure and said encoder gear so as to transfer motion of said drive gear structure to said encoder gear such that said encoder gear rotates at fewer revolutions per minute than said drive gear structure; and a printed circuit board mounted within said housing assembly and having an electric circuit, said circuit including a plurality of stationary circuit board electrically conductive contacts, a microprocessor, and a pair of relays electrically coupled between the motor and the microprocessor, said circuit board contacts being arranged in such a manner so as to be engaged by associated encoder gear conductive contacts upon rotation of said encoder gear, certain of circuit board contacts being associated with particular positions of the movable panel such that upon rotation of said encoder gear, electrical contact between certain of said circuit board contacts and certain of said encoder gear contacts generates binary codes associated with particular positions of the movable panel, the binary codes being inputted to said microprocessor, said microprocessor being constructed and arranged to decode a present panel position based on said binary codes in response to a user inputted signal corresponding to a desired panel position, said microprocessor controlling the direction of rotation of said output shaft in response to the user inputted signal by energizing one relay of said pair of relays, thereby controlling the direction of movement of said drive gear structure and thus the movement of the panel.

2. The system according to claim 1, wherein four circuit board conductive contacts are provide and each of said encoder gear contacts is associated with a respective circuit board conductive contact, one of the circuit board conductive contacts is connected to ground and each of the other circuit board conductive contacts is associated with a particular position of the movable panel, each of said other circuit board conductive contacts are tied to a positive voltage supply through a pull-up resistor, whereby, upon rotation of said encoder gear, certain circuit board contacts are electrically shorted together when contacted by certain encoder gear contacts thereby generating said binary codes.

3. The system according to claim 2, wherein said encoder gear contacts are each in the form of a resilient, generally arcuate-shaped brush extending from said surface of said encoder gear.

4. The system according to claim 1, wherein said circuit is constructed and arranged such that when said relays are de-energized, the motor is held at ground potential so as to facilitate dynamic braking of the motor.

5. The system according to claim 1, wherein said drive gear structure includes a central portion, a pinion extending from the central portion at one end thereof and a spur gear extending from the central portion at an end opposite said one end, the pinion being constructed and arranged to rotate in response to rotation of the output shaft and to engage and move the cable pair, said spur gear being in engaged relation with said idler gear.

6. The system according to claim 5, wherein said pinion extends from said housing assembly between said channels and is constructed and arranged such that rotation of said pinion in one direction may move the cables linearly in opposite directions.

7. The system according to claim 5, wherein said drive gear structure is composed of metal and said idler gear and said encoder gear are each composed of plastic material.

8. The system according to claim 1, further comprising tube assemblies constructed and arranged to mount a portion of a respective cable of the cable pair to an associated channel.

9. The system according to claim 8, wherein said tube assemblies are constructed and arranged such that the cables may be mounted with respect thereto for sliding movement therein, and wherein one tube assembly is provided for each cable, each of said tube assemblies including first and second tubular members constructed and arranged to engage an associated channel.

10. The system according to claim 5, wherein said motor assembly includes a projection engaged with said pinion, said projection being coupled to said output shaft such that rotation of said output shaft is transmitted to said drive gear structure.

11. The system according to claim 5, wherein said idler gear includes a pinion portion and a gear portion opposite the pinion portion, said pinion portion being in engaged relation with said encoder gear and said gear portion being in engaged relation with said spur gear.

* * * * *